US006990727B1

(12) United States Patent
Butler et al.

(10) Patent No.: US 6,990,727 B1
(45) Date of Patent: Jan. 31, 2006

(54) METHOD OF MAKING DISK DRIVES USING A FRAME ARRAY WITH A PLURALITY OF DISK DRIVE BASE PORTIONS

(75) Inventors: Walter W. Butler, Scotts Valley, CA (US); Keith R. Berding, San Jose, CA (US); Joseph M. Viglione, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 519 days.

(21) Appl. No.: 10/286,659

(22) Filed: Oct. 31, 2002

(51) Int. Cl.
*G11B 5/27* (2006.01)
*G11B 17/04* (2006.01)
*H04R 31/00* (2006.01)

(52) U.S. Cl. .............................. 29/603.03; 29/603.04; 29/603.09; 29/827; 360/99.06

(58) Field of Classification Search ............. 29/603.03, 29/603.09, 827, 603.04; 360/98.1, 104, 99.06, 360/99.01; 264/405, 439, 252, 254; 206/405, 206/456, 444
See application file for complete search history.

(56) References Cited

U.S. PATENT DOCUMENTS

| 4,860,897 A | * | 8/1989 | Fowler et al. ............... 206/454 |
| 4,999,724 A | * | 3/1991 | McAllister et al. ....... 360/98.08 |
| 5,011,016 A | * | 4/1991 | Ozeki ......................... 206/456 |
| 5,471,733 A | * | 12/1995 | Bernett et al. ........... 29/603.03 |
| 5,986,852 A | * | 11/1999 | Berg et al. ................ 360/265.9 |
| 6,202,288 B1 | * | 3/2001 | Shiraishi et al. ......... 29/603.03 |

* cited by examiner

*Primary Examiner*—A. Dexter Tugbang
*Assistant Examiner*—Tai Nguyen
(74) *Attorney, Agent, or Firm*—Stetina Brunda Garred & Brucker; Joshua C. Harrison, Esq.

(57) ABSTRACT

An aspect of the invention can be regarded as a method of making disk drives. The method includes providing a frame array. The frame array includes a frame, a plurality of disk drive base portions, and a plurality of tie bars connected between the frame and the disk drive base portions. The method further includes attaching a respective disk drive component to each of the disk drive base portions. The method further includes removing the disk drive base portions from the frame by severing the tie bars.

27 Claims, 8 Drawing Sheets

METHOD OF MAKING DISK DRIVES USING A FRAME ARRAY WITH A PLURALITY OF DISK DRIVE BASE PORTIONS

CROSS-REFERENCE TO RELATED APPLICATIONS

Not applicable.

BACKGROUND OF THE INVENTION

1. Field of the Invention

The present invention relates generally to disk drives, and in particular to a method of making disk drives using a frame array with a plurality of disk drive base portions.

2. Description of the Prior Art

The typical hard disk drive includes a head disk assembly (HDA) and a printed circuit board assembly (PCBA) may be attached to a disk drive base of the HDA or incorporated with circuitry associated with a host device that the disk drive supports. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that may be integrated with the disk drive base. A shaft is coupled to the spindle motor base and the spindle motor hub surrounds the shaft. The spindle motor hub may be rotatably coupled to the shaft, and therefore the spindle motor base, typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The head stack assembly includes the actuator assembly, at least one head gimbal assembly (HGA), and a flex circuit cable assembly that are attached to the actuator assembly. A conventional "rotary" or "swing-type" actuator assembly typically comprises an actuator body, a pivot bearing cartridge, one or more actuator arms that extend from one side of the actuator body, and a coil portion that extends from an opposite side of the actuator body. The actuator body includes a bore and the pivot bearing cartridge engaged within the bore for allowing the actuator body to rotate between limited positions. The coil portion includes a coil that is configured to interact with one or more permanent magnets to form a voice coil motor.

At least one head gimbal assembly is distally attached to each of the actuator arms. A head gimbal assembly includes an air bearing slider with a transducer head. The voice coil motor is configured to allow the actuator assembly to be controllably rotated or pivoted so as to move the sliders with the transducer heads relative to the disks for reading and writing operations with respect to the tracks contained on the rotating disks. The printed circuit board assembly is disposed in electrical communication with the coil via the flex circuit cable assembly for providing a control current to energize the coil to create an electromagnetic field that interacts with the permanent magnets to controllably position the actuator assembly.

A topic of concern is the desire to reduce the overall disk drive size. Such disk drives may have a variety of applications such as in hand held or portable electronic devices. The exterior size and shape of the disk drive is often referred to as a "form factor". Fabrication of such disk drives having reduced form factors has proven challenging. In this regard, the handling and assembly of the various disk drive components is difficult due to their relatively small size. Application of traditional disk drive fabrication techniques has proven to be inefficient with respect to mass production of such reduced form factor disk drives. Accordingly, there is a need in the art for an improved method of making disk drives in comparison to the prior art.

SUMMARY OF THE INVENTION

An aspect of the invention can be regarded as a method of making disk drives. The method begins with providing a frame array. The frame array includes a frame, a plurality of disk drive base portions, and a plurality of tie bars connected between the frame and the disk drive base portions. A respective disk drive component is attached to each of the disk drive base portions. Finally, the disk drive base portions are removed from the frame by severing the tie bars.

According to various embodiments of the present invention, the frame array may be formed of metal and may be of a stamped nature. Prior to the attachment of the disk drive components, the method may further include the step of partially encapsulating each of the disk drive base portions with a hardenable material. This may be accomplished through a molding process with the hardenable material being a plastic. In an embodiment, selected ones of the tie bars may be electrical leads. The disk drive components may be electrical components and the method may include respectively electrically connecting the electrical components to the electrical leads. The method may further include respectively testing operation of the disk drive components. The disk drive components may be head stack assemblies or spindle motors for example. In another arrangement, the frame array may be formed of plastic. In addition, a lead frame may be provided which is overlaid with the frame array. The lead frame includes electrical leads and the disk drive components may be electrical components with such electrical components being respectively electrically attached to the electrical leads. The method may further include insert molding respective inserts with each of the disk drive base portions. The inserts may be voice coil motor components for example. Further, the frame includes recesses for indexing the frame array.

DESCRIPTION OF THE PREFERRED EMBODIMENTS

Figure 1:
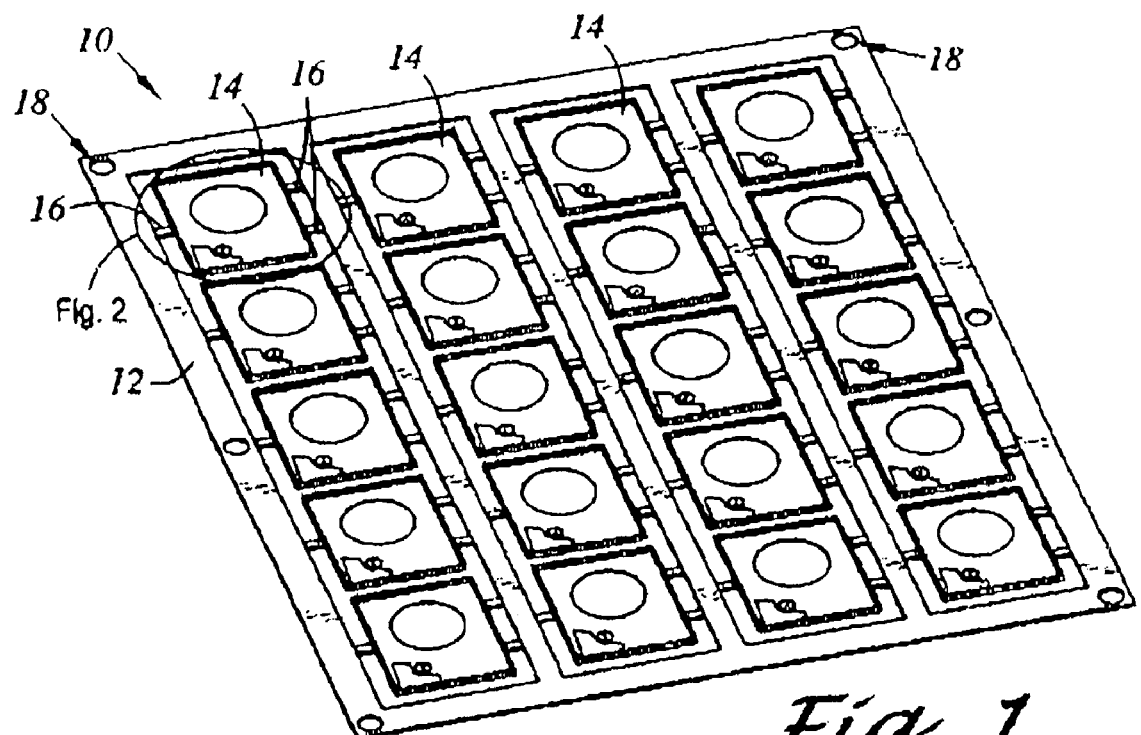
FIG. 1 is a perspective view of a frame array including disk drive base portions as used in a method of an aspect of the present invention.

Referring now to the drawings wherein the showings are for purposes of illustrating preferred embodiments of the present invention only, and not for purposes of limiting the same, FIGS. 1–12 illustrate methods of making disk drives in accordance with the aspects of the present invention.

Figure 3:
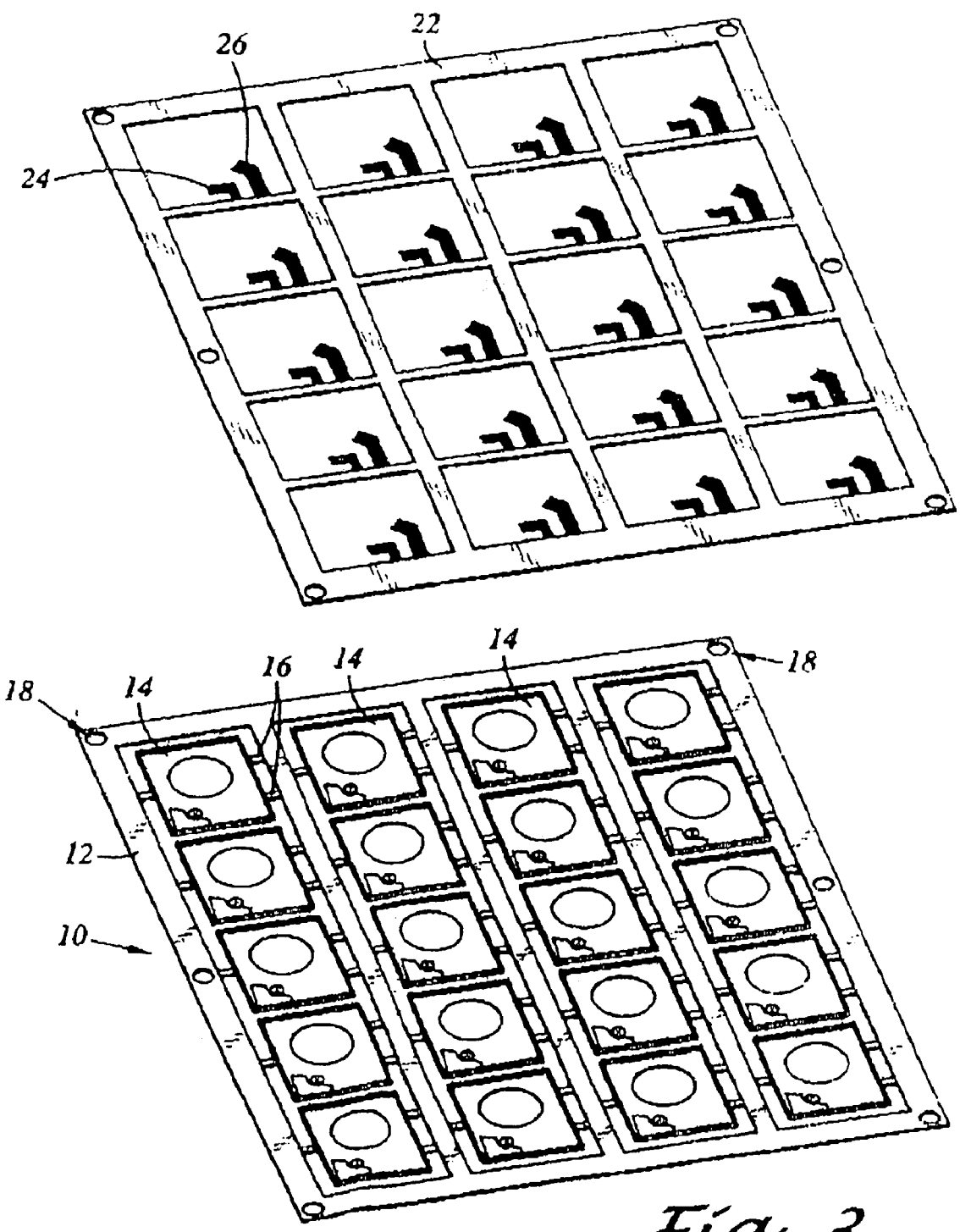
FIG. 3 is the frame array of FIG. 1 as shown with a lead frame.
Figure 4:
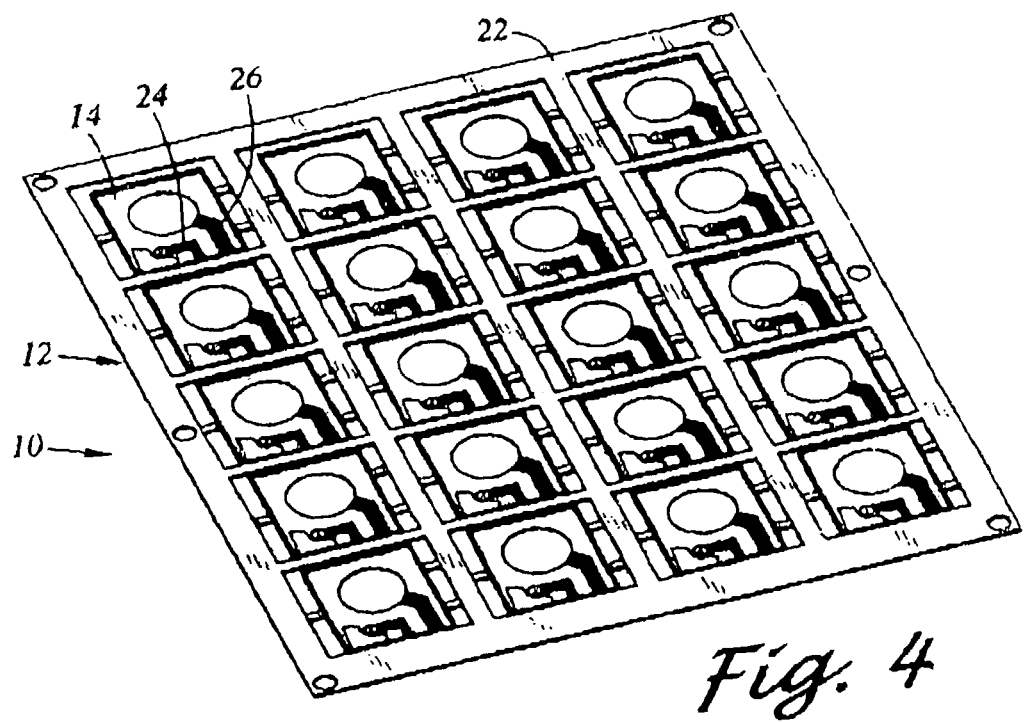
FIG. 4 is the frame array and the lead frame of FIG. 3 with the lead frame overlaid upon the frame array.
Figure 5:
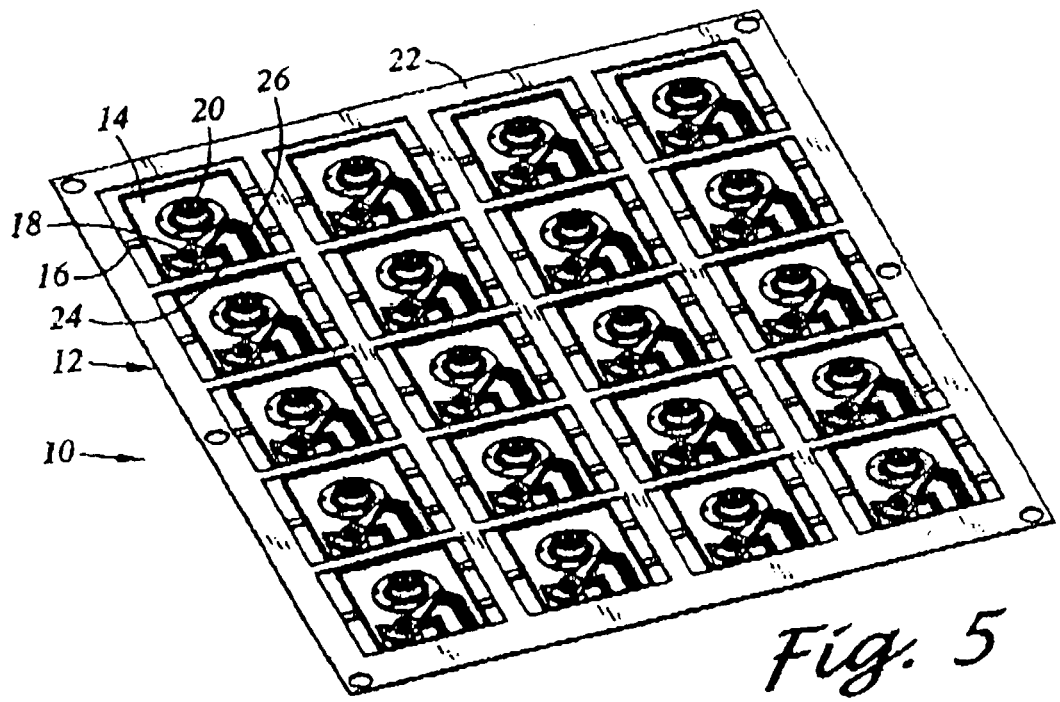
FIG. 5 is the frame array and the lead frame of FIG. 4 with head stack assemblies and spindle motors attached.
Figure 6:
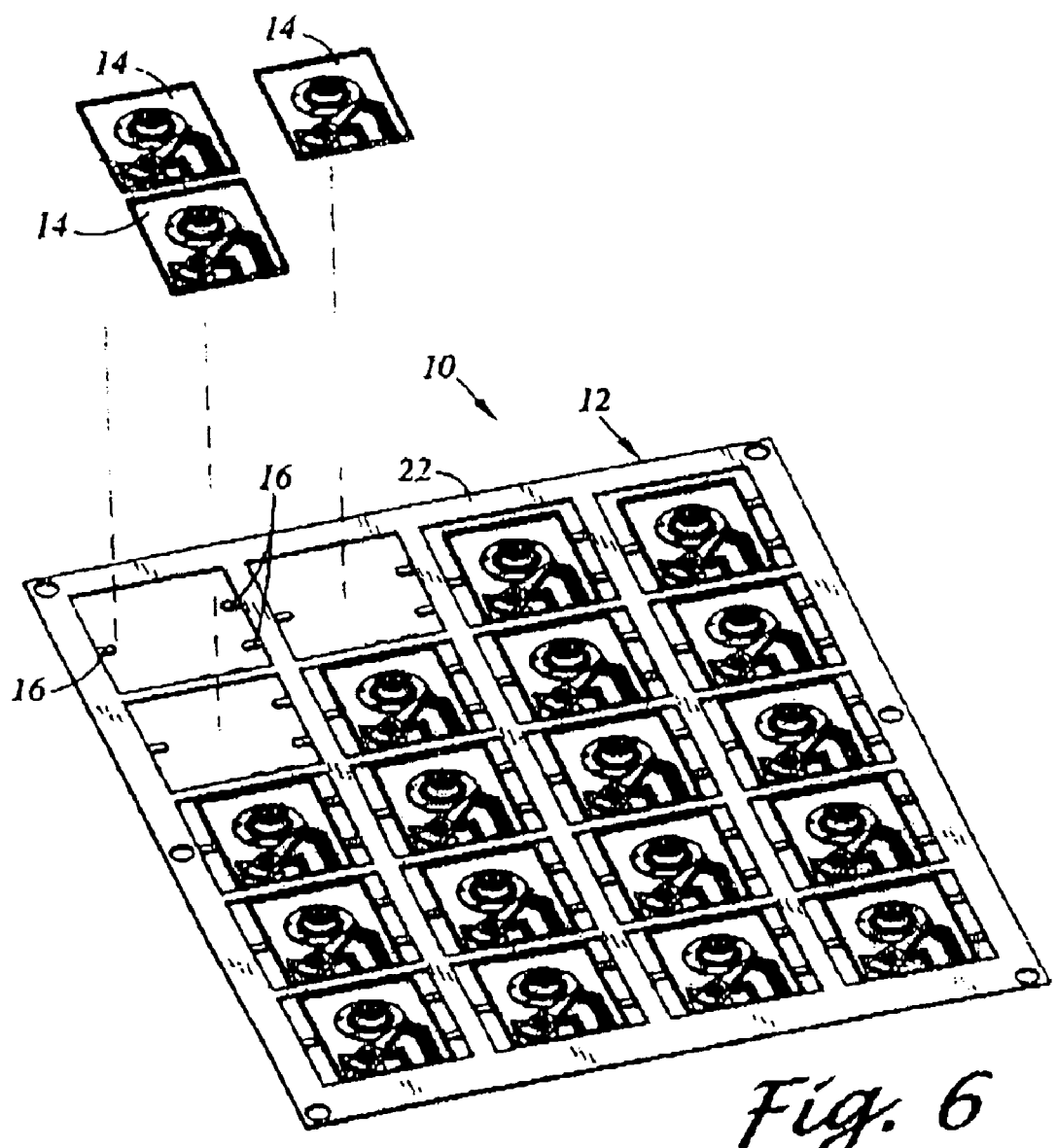
FIG. 6 is the frame array and the lead frame of FIG. 5 with a few of the disk drive base portions removed.
Figure 7:
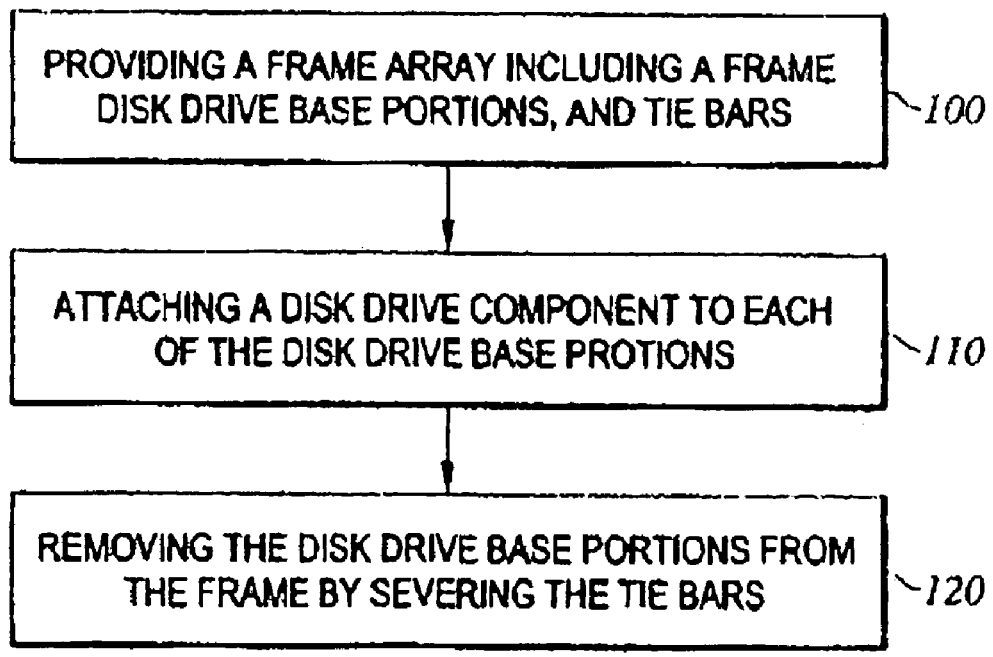
FIG. 7 is a flow diagram of a method of an aspect of the present invention.

FIGS. 1–6 depict an embodiment of a frame array 10 as shown through a series of fabrication process steps of a method of an aspect of the present invention, and FIG. 7 is a flow 8 diagram of the method. In this respect, an aspect of the invention can be regarded as a method of making disk drives. The method begins with step 100 of providing a frame array 10 as shown in FIG. 1. The frame array 10 includes a frame 12, a plurality of disk drive base portions 14, and a plurality of tie bars 16 connected between the frame 12 and the disk drive base portions 14. As shown in FIG. 5, the method includes a step 110 of attaching a respective disk drive component, such as a head stack assembly 18 or a spindle motor 20, to each of the disk drive base portions 14. Finally, according to step 120, the disk drive base portions 14 are removed from the frame 12 by severing the tie bars 16. It is contemplated that the present method may facilitate a substantial amount of a fabrication process of a disk drive at a single fabrication station. In this regard, inefficiencies associated with individual handing of separately formed disk drive base portions 14 may be mitigated. Moreover, the use of the frame array 10 may even eliminate the need to utilize certain fabrication stations and thereby eliminate transit times to such stations.

Figure 2:
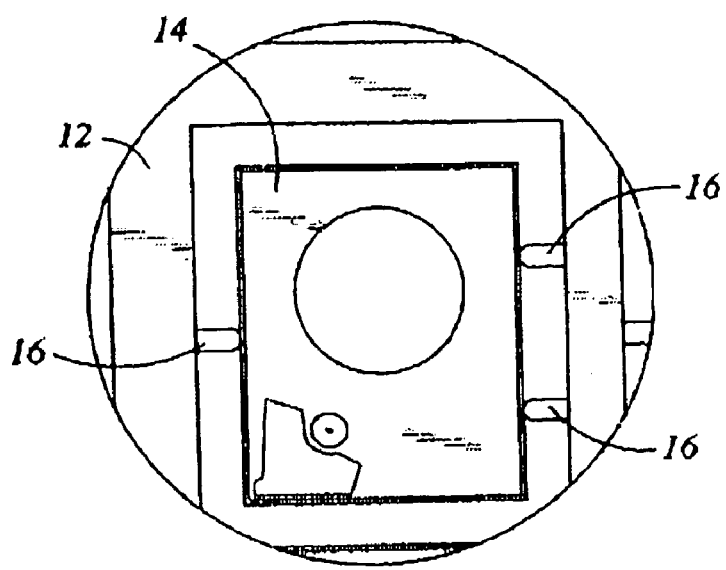
FIG. 2 is an enlarged view of a portion of the frame array of FIG. 1.

In further detail, according to the embodiment of the frame array 10 of FIG. 1, the frame array 10 is provided. FIG. 2 is an enlarged view of a portion of the frame array 10. In this embodiment, a four by five array of disk drive base portions 14 is depicted. It is contemplated that other configurations that include additional or fewer number of disk drive base portions 14 may be practiced. The number and configuration of the disk drive base portions 14 may be influenced by automated tooling and/or human handing limitations.

In this embodiment, the frame array 10 may be formed of a variety of material such as a metal material or a plastic material. The frame 12, the disk drive base portions 14, and the tie bars 16 may all be commonly formed of the same plastic material. As such, construction of the frame array 10 may be through an injection molding process. Various surface contour features may be incorporated into the design of the disk drive base portions 14 to perform the required functions of a disk drive base as utilized in a disk drive. This may include surface contour features that perform structural support for any number of disk drive components.

The frame 12 may include recesses 18 for indexing the frame array 10. As such, fabrication tooling may engage the frame array 10 at the recesses 18. For example, fabrication tooling may include a tooling block that the frame array 10 sits upon and pins may extend upward through the recesses 18. Such recesses 18 need not be formed as holes as shown, but may be any number of geometries such as notches formed about the periphery of the frame 12.

Referring now to FIG. 3, there is depicted the frame array 10 of FIG. 1 as shown with a lead frame 22. FIG. 4 depicts the lead frame 22 overlaid upon the frame array 10. The method may provide for overlaying the lead frame 22 upon the frame array 10. The lead frame 22 may be formed of a metal material as shown, or formed of a flex circuit or rigid material for example. In this regard, the lead frame 22 may include various electrical leads, such as electrical leads 24, 26. As mentioned above, the method includes a step 110 of attaching a respective disk drive component to each of the disk drive base portions 14. In this regard, the method may further include respectively electrically attaching the disk drive components, such as a head stack assembly 19 or a spindle motor 20, to the electrical leads 24, 26 as shown in FIG. 5.

Referring now to FIG. 6, there is depicted step 120 of removing the disk drive base portions 14 from the frame 12 by severing the tie bars 16. In this regard, three of the disk drive base portions 14 are shown as removed. In addition to severing the tie bars 16, the electrical leads 24, 26 may be severed during this step as well. It is contemplated that the tie bars 16 as well as the electrical leads 24, 26 may be particularly formed to have a geometry which includes a region of less material or indentations so as to be readily severable (i.e., the disk drive base portions 14 may in effect be of a "snap out" type of part with respect to the frame 12).

Figure 8:
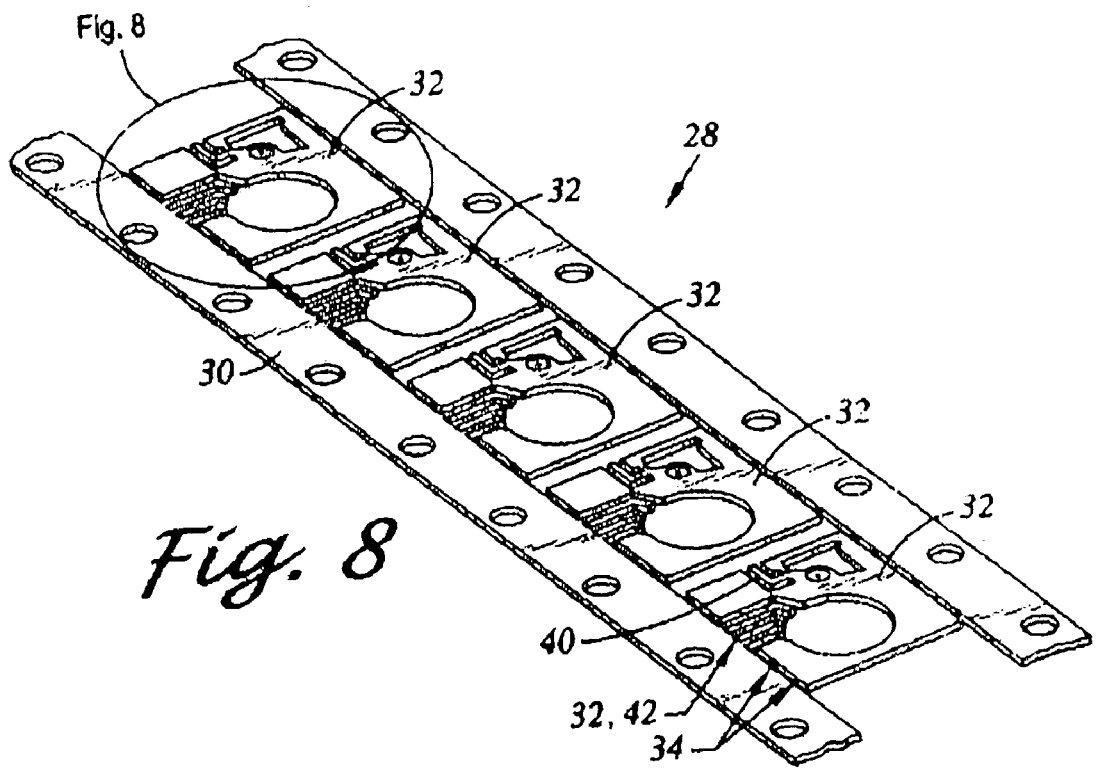
FIG. 8 is a frame array in the form of a strip including disk drive base portions as used in a method of an aspect of the present invention.
Figure 9:
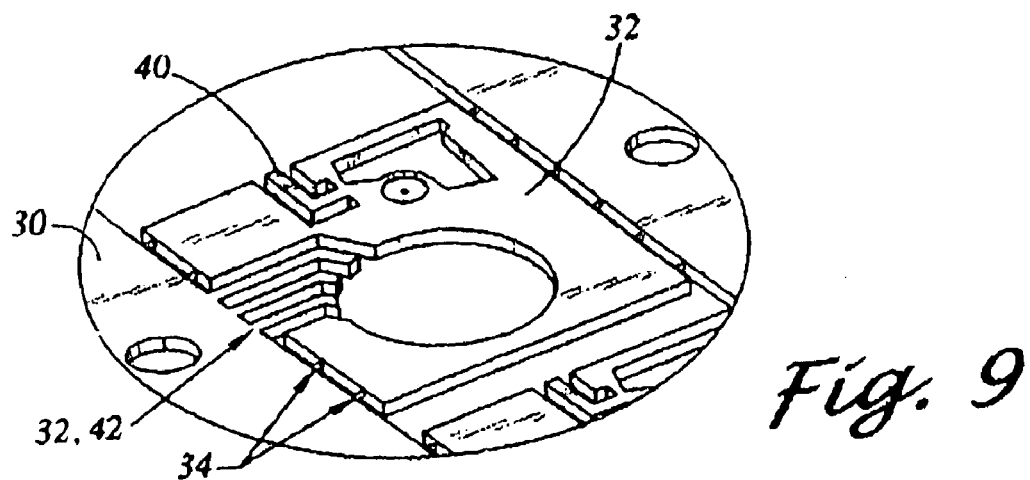
FIG. 9 is an enlarged view of a portion of the frame array of FIG. 8.

There is depicted another embodiment of a frame array 28 as shown in FIGS. 8–12. As shown in FIG. 8, the frame array 28 may take the form of a strip. The frame array 28 includes a frame 30 and disk drive base portions 32. Tie bars 34 are disposed between the frame 30 and the disk drive base portions 32. FIG. 9 is an enlarged view of a portion of the frame array 28 of FIG. 8. In this embodiment, the frame array 28 is formed of a metal material. Further, the frame array 28 may be of a stamped nature. Such a strip configuration of a stamped metal 14 material is contemplated to lend itself to a relatively continuous mass production technique as the frame array 28 may be dispensed in a roll form and reel fed into a fabrication station.

Figure 10:
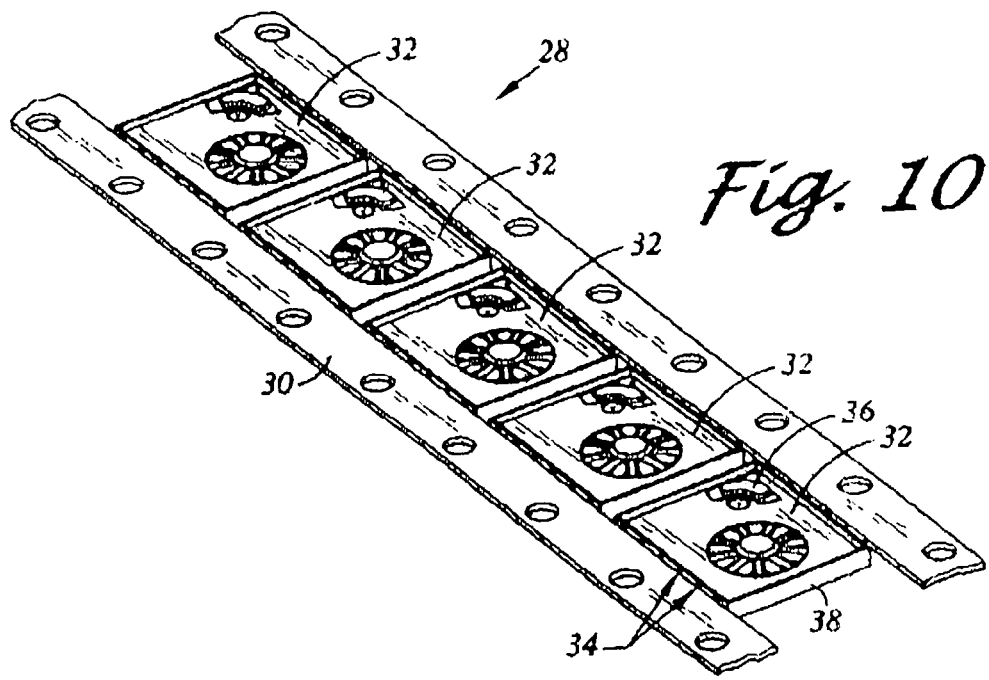
FIG. 10 is the frame array of FIG. 8 with the disk drive base portions with inserts encapsulated with a hardenable material.

Referring now to FIG. 10, there is depicted the frame array 28 of FIG. 8 after having undergone an encapsulation process. As shown, the disk drive base portions 32 may be encapsulated with a hardenable material such as plastic. This may be accomplished through a molding process. The method may further include insert molding respective inserts with each of the disk drive base portions 32. For example, the inserts may be voice coil motor components 36 such as a magnet and back iron. The inserts may further include spindle motor stators 38. In this regard, the inserts may be electrical components that are attached to the disk drive base portions 32 through the molding process. The frame array 28 may further include electrical leads 40, 42. In this regard, selective ones of the tie bars 34 may be the electrical leads 40, 42. Further, as such inserts may be electrical components, the method may include respectively electrically connecting such electrical components to the electrical leads

Figure 11:
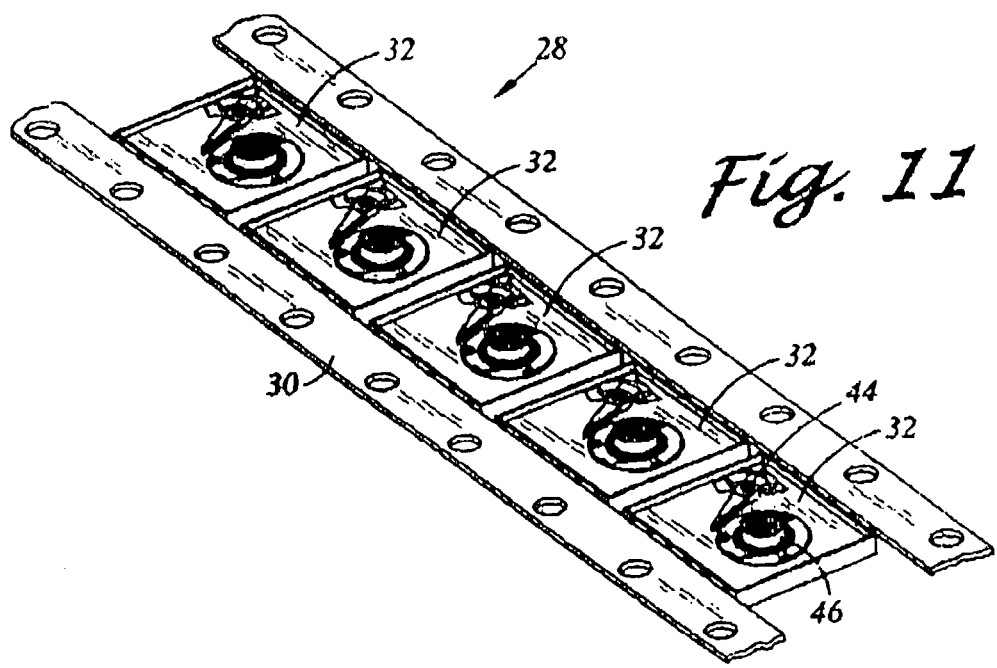
FIG. 11 is the encapsulated frame array of FIG. 10 with head stack assemblies and spindle motors attached to the disk drive base portions.
Figure 12:
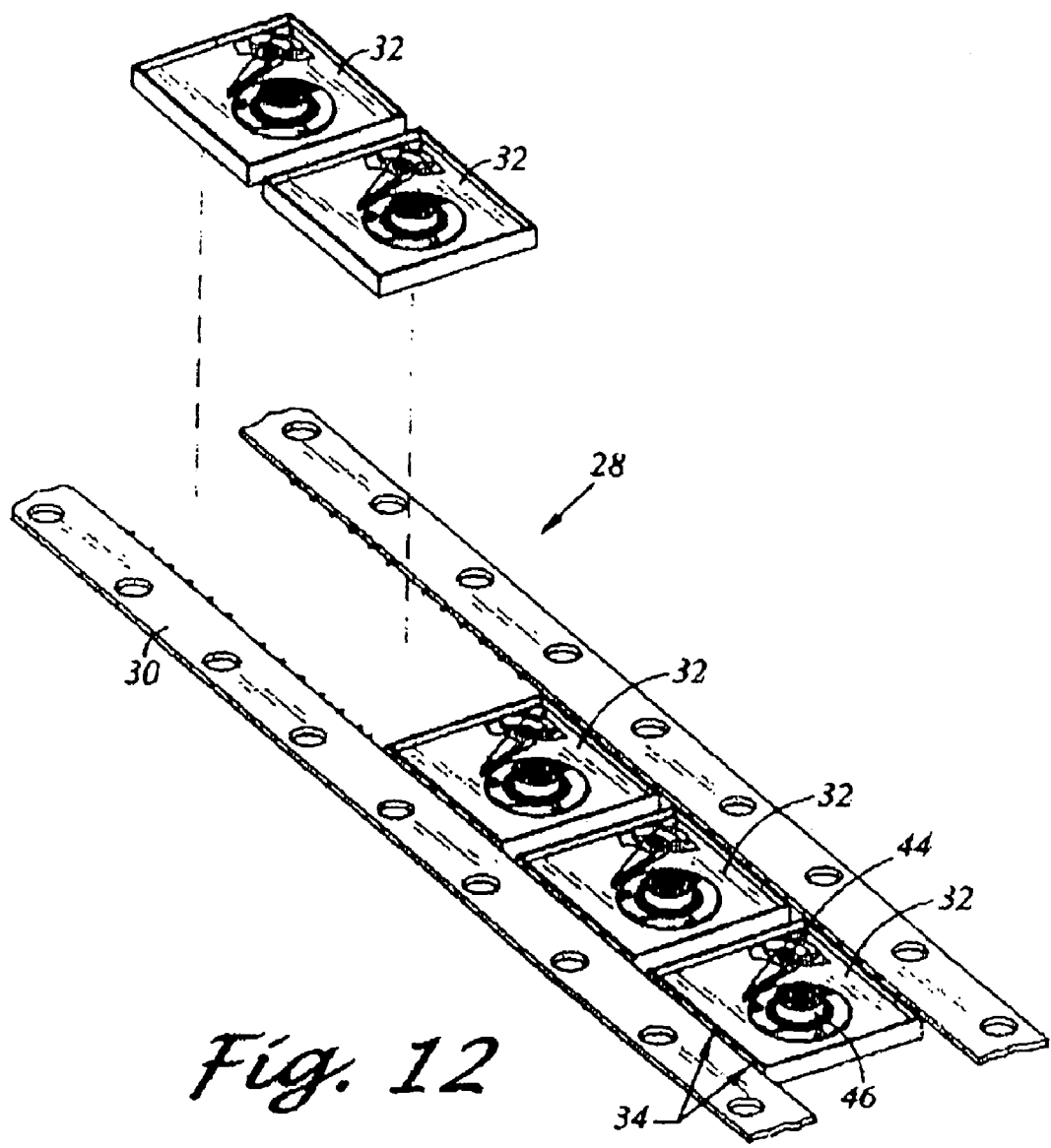
FIG. 12 is the frame array of FIG. 11 with a couple of the disk drive base portions removed.

40, 42. Referring now to FIG. 11, there is depicted the encapsulated frame array 28 of FIG. 10 with additional disk drive components in the form of head stack assemblies 44 and spindle motors 46 attached to the disk drive base portions 32. Finally as shown in FIG. 12, there is depicted the frame array 28 of FIG. 11 with a couple of the disk drive base portions 32 removed.

The method may further include respectively testing operation of the disk drive components. In this regard, prior to the removal step, the various disk drive components may be tested, such as the spindle motors, the voice coil motors, and the head stack assemblies. As such disk drive base portions 32 are still attached to the frame 30, the various components may be tested at the same single fabrication station where such components are attached, thereby avoiding the need to utilize a separate testing station.

We claim:

1. A method of making disk drives comprising:
   a) providing a frame array including:
      a frame;
      a plurality of disk drive base portions; and
      a plurality of tie bars connected between the frame and the disk drive base portions;
   b) attaching a respective disk drive component to each of the disk drive base portions, the disk drive component being a spindle motor; and
   c) removing the disk drive base portions from the frame by severing the tie bars.

2. The method of claim 1 wherein the frame array is formed of metal.

3. The method of claim 1 wherein the frame array is formed by stamping.

4. The method of claim 1, prior to step b), further comprises the step of:
   partially encapsulating each of the disk drive base portions with a hardenable material.

5. The method of claim 4 wherein the encapsulating is a molding process.

6. The method of claim 4 wherein the hardenable material is a plastic.

7. The method of claim 1 wherein selected ones of the tie bars are electrical leads.

8. The method of claim 7 wherein the disk drive components are electrical components and step b) further includes respectively electrically connecting the electrical components to the electrical leads.

9. The method of claim 8 wherein step b) further includes respectively testing operation of the disk drive components.

10. The method of claim 1 wherein the frame array is formed of plastic.

11. The method of claim 10 wherein step a) further includes providing a lead frame overlaid with the frame array, the lead frame includes electrical leads, the disk drive components are electrical components, step b) further includes respectively electrically attaching the disk drive components to the electrical leads.

12. The method of claim 1, prior to step b), further including molding inserts with each of the disk drive base portions.

13. The method of claim 12 wherein the inserts are voice coil motor components.

14. The method of claim 1 wherein the frame includes recesses for indexing the frame array.

15. A method of making disk drives comprising:
   a) providing a frame array including:
      a frame;
      a plurality of disk drive base portions; and
      a plurality of tie bars connected between the frame and the disk drive base portions;
   b) attaching a respective disk drive component to each of the disk drive base portions, the respective disk drive component being a voice coil motor component, the attaching including molding a voice coil motor component with each of the disk drive base portions; and
   c) removing the disk drive base portions from the frame by severing the tie bars.

16. The method of claim 15 wherein the frame array is formed of metal.

17. The method of claim 15 wherein the frame array is formed by stamping.

18. The method of claim 15, prior to step b), further comprises the step of:
   partially encapsulating each of the disk drive base portions with a hardenable material.

19. The method of claim 18 wherein the encapsulating is a molding process.

20. The method of claim 18 wherein the hardenable material is a plastic.

21. The method of claim 15 wherein selected ones of the tie bars are electrical leads.

22. The method of claim 21 further including electrically connecting the voice coil motor component to the electrical leads.

23. The method of claim 22 wherein step b) further includes respectively testing operation of the disk drive components.

24. The method of claim 15 wherein the frame array is formed of plastic.

25. The method of claim 24 wherein step a) further includes providing a lead frame overlaid with the frame array, the lead frame including electrical leads, and step b) further includes electrically attaching the voice coil component to the electrical leads.

26. The method of claim 15 wherein the molding is insert molding.

27. The method of claim 15 wherein the frame includes recesses for indexing the frame array.

* * * * *